(12) United States Patent
Howson

(10) Patent No.: US 8,310,487 B2
(45) Date of Patent: Nov. 13, 2012

(54) MULTI-CORE GEOMETRY PROCESSING IN A TILE BASED RENDERING SYSTEM

(75) Inventor: John W. Howson, St. Albans (GB)

(73) Assignee: Imagination Technologies Limited, Kings Langley, Herts (GB)

( * ) Notice: Subject to any disclaimer, the term of this patent is extended or adjusted under 35 U.S.C. 154(b) by 629 days.

(21) Appl. No.: 12/315,263

(22) Filed: Dec. 1, 2008

(65) Prior Publication Data

US 2009/0174706 A1 Jul. 9, 2009

(51) Int. Cl.
*G06F 15/16* (2006.01)
(52) U.S. Cl. ........ 345/502; 345/503; 345/505; 345/506; 345/419; 382/303; 382/304; 712/28
(58) Field of Classification Search .................. 345/502, 345/505, 506; 382/303, 304; 712/28
See application file for complete search history.

(56) References Cited

U.S. PATENT DOCUMENTS

| | | | | |
|---|---|---|---|---|
| 5,485,559 A * | 1/1996 | Sakaibara et al. | ............. | 345/505 |
| 5,745,125 A * | 4/1998 | Deering et al. | ................ | 345/503 |
| 5,821,950 A * | 10/1998 | Rentschler et al. | ........... | 345/505 |
| 6,344,852 B1 * | 2/2002 | Zhu et al. | ....................... | 345/418 |
| 6,798,410 B1 * | 9/2004 | Redshaw et al. | ............... | 345/427 |
| 7,002,586 B2 * | 2/2006 | Chiu et al. | ..................... | 345/505 |
| 7,898,545 B1 * | 3/2011 | Alben et al. | ................... | 345/519 |
| 2007/0146378 A1 * | 6/2007 | Sorgard et al. | ................. | 345/581 |

FOREIGN PATENT DOCUMENTS

GB  2 430 513 A  3/2007

OTHER PUBLICATIONS

Search Report from United Kingdom Patent Office dated Mar. 27, 2009 (1 page).
International Search Report dated May 8, 2009 (4 pages).
Written Opinion of International Search Authority (6 pages).
Montryn, JS et al. "InfiniteReality: A Real-Time Graphics System", Computer Graphics Proceedings, Annual Conference Series, 1997, pp. 293-302.
Igehy, H et al. "The Design of a Parallel Graphics Interface", Computer Graphics. Conference Proceedings, Orlando, FL Jul. 19-24, 1998, pp. 141-150.
Eldridge, Matthew "Designing Graphics Architectures Around Scalability and Communication" Jun. 1, 2001, retrieved from Internet: URL:http://graphics.stanford.edu/papers/eldridge_thesis/eldridge_phd.pdf.
Holten-Lind, Hans "Design for Scalability in 3D Computer Graphics Architectures" Jun. 1, 2001, retrieved from Internet: URL:http//ww2.imm.dtu.dk/pubdb/views/edoc_download.php/888/pdf/imm888.pdf.
Coppen, Derek et al. "A Distributed Frame Buffer for Rapid Dynamic Changes to 3D Scenes" Computers and Graphics, Mar. 1, 1995, pp. 247-250.

* cited by examiner

*Primary Examiner* — Xiao M. Wu
*Assistant Examiner* — Todd Buttram
(74) *Attorney, Agent, or Firm* — Flynn, Thiel, Boutell & Tanis, P.C.

(57) ABSTRACT

A method and an apparatus are provided for combining multiple independent tile based graphic cores. An incoming geometry stream is split into a plurality of streams and sent to respective tile based graphics processing cores. Each one generates a separate tiled geometry lists. These may be combined into a master tiling unit or, alternatively, markers may be inserted into the tiled geometry lists which are used in the rasterization phase to switch between tiling lists from different geometry processing cores.

26 Claims, 7 Drawing Sheets

EXAMPLE TILE BASED RENDERING SYSTEM

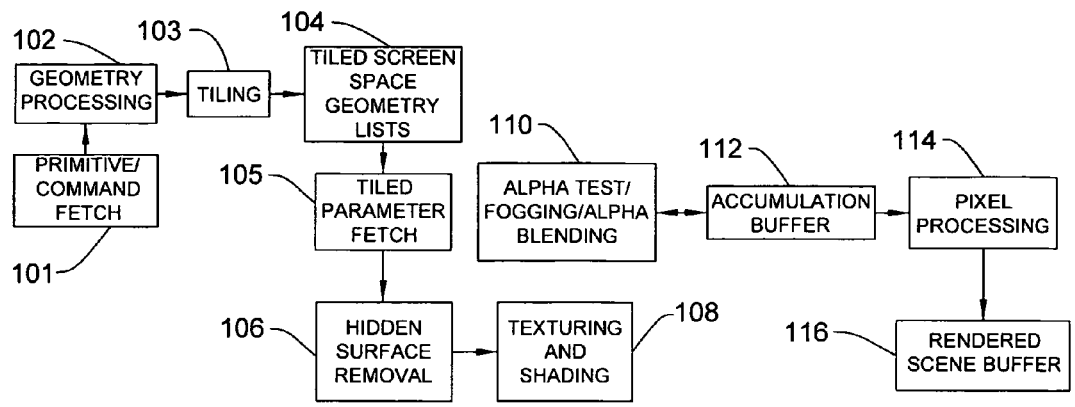
FIGURE 1-EXAMPLE TILE BASED RENDERING SYSTEM
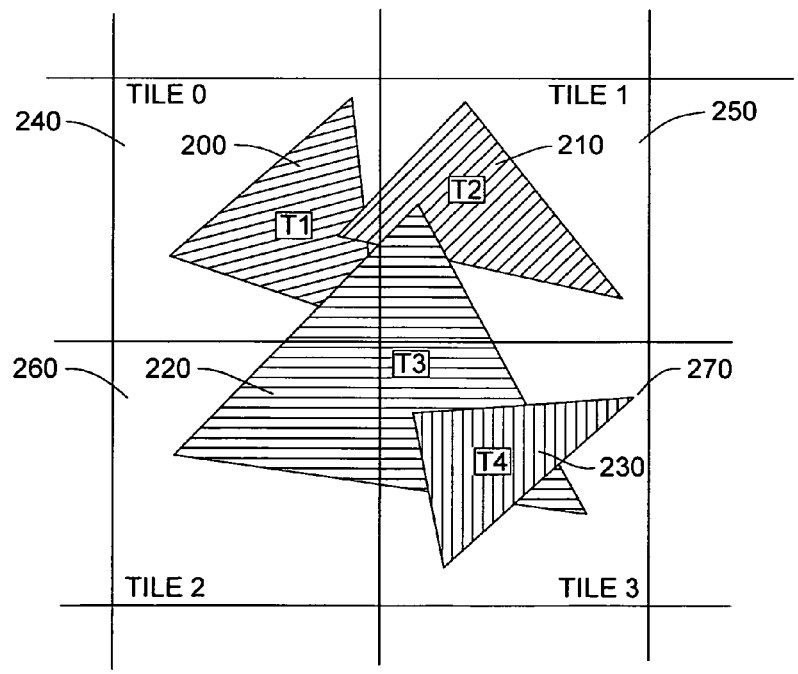
FIGURE 2-EXAMPLE OF TILE OVERLAP AND TRIANGLE ORDERING WITHIN TILES

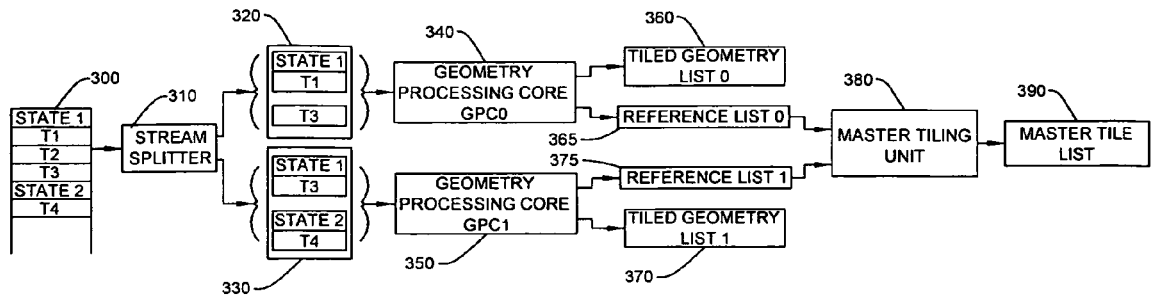
FIG. 3-SPLITTTING OF CONTROL STREAM ACROSS MULTIPLE CORES
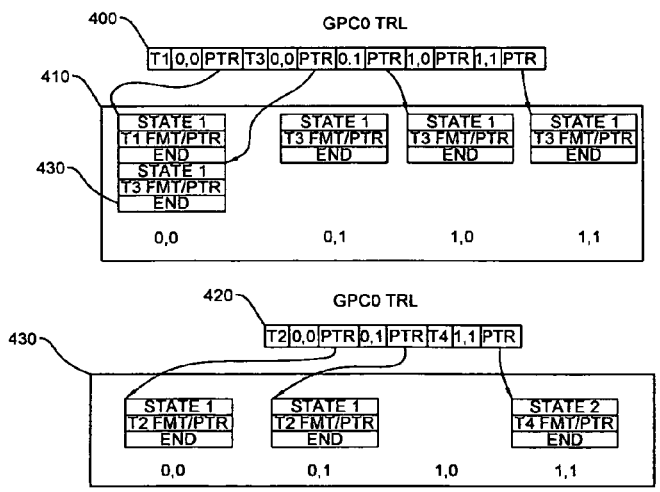
FIG. 4-TILE REFERENCE LIST DATA STRUCTURE

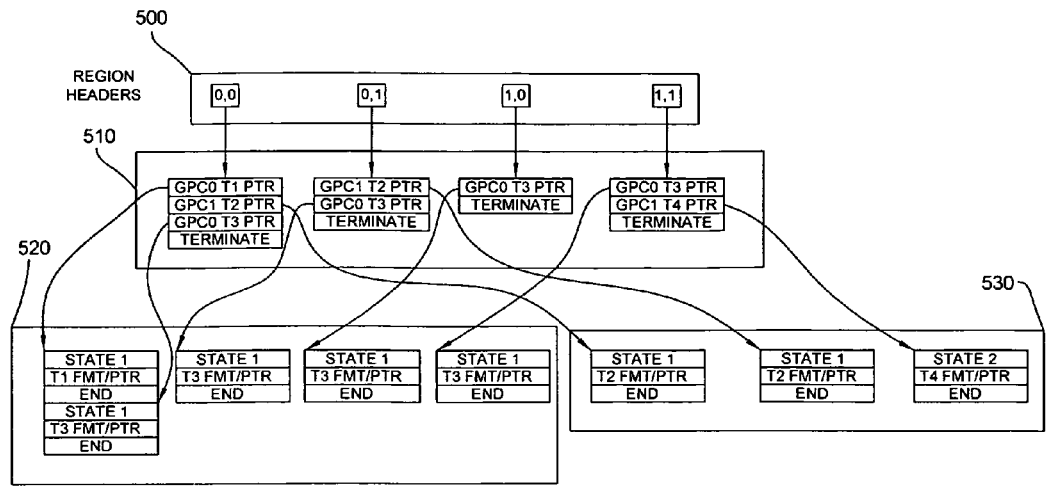
FIG. 5-HIERARCHIAL TILE LIST STRUCTURE
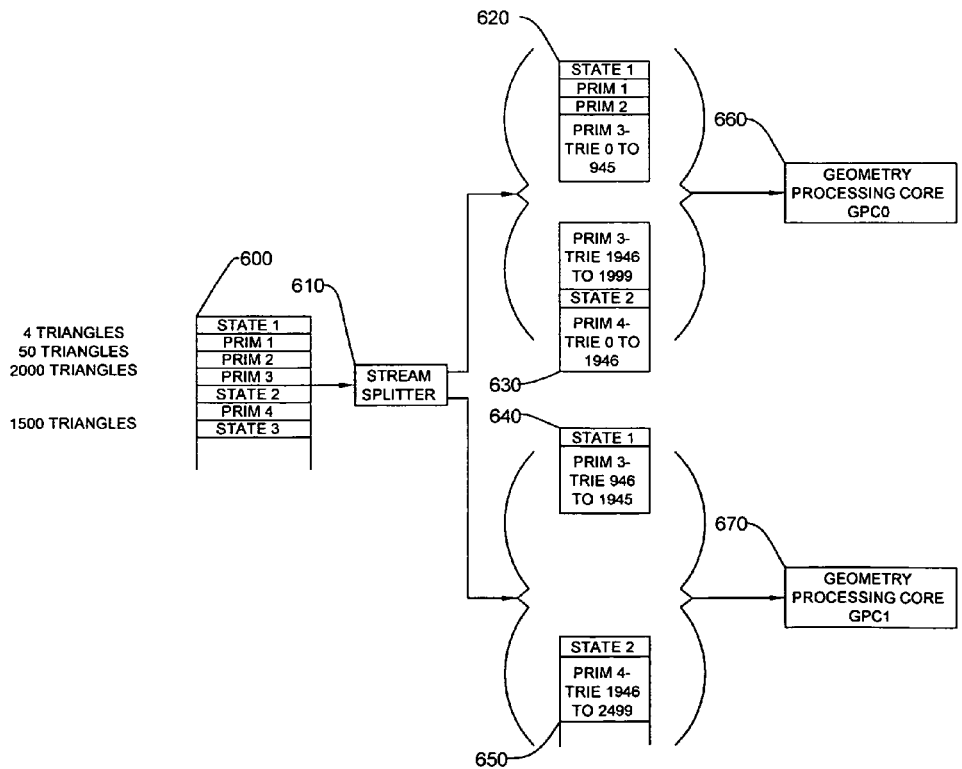
FIG. 6-BLOCK BASED PRIMITIVE SPLITTING

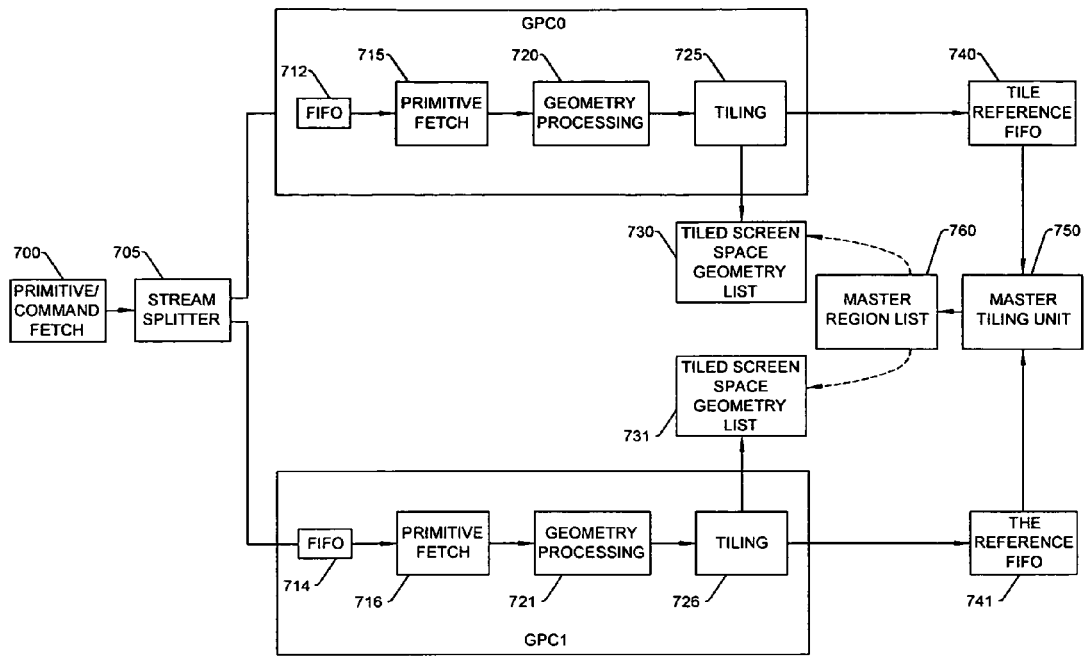
FIG. 7-EXAMPLE SYSTEM
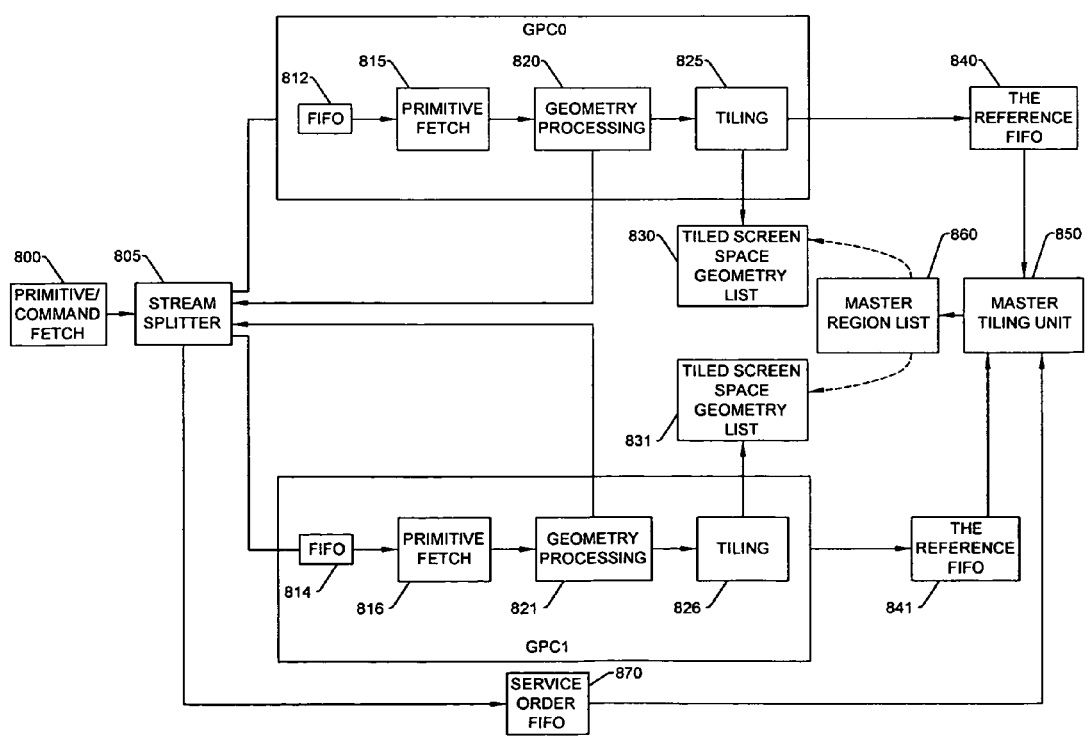
FIG. 8-ALERNATIVE EXAMPLE SYSTEM

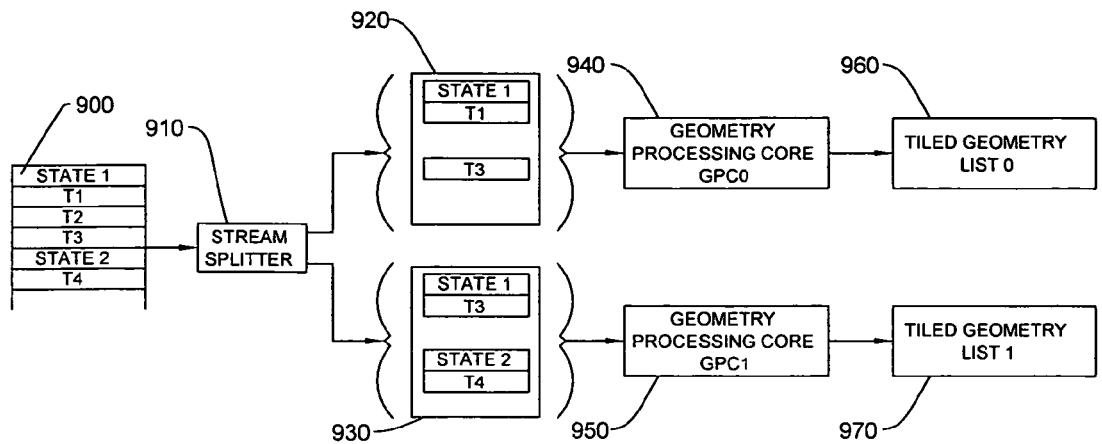
FIG. 9-SPLITTING OF GEOMETRY PROCESSING ACROSS MULTIPLE CORES USING "PIPELINE INTERLEAVE MARKERS"
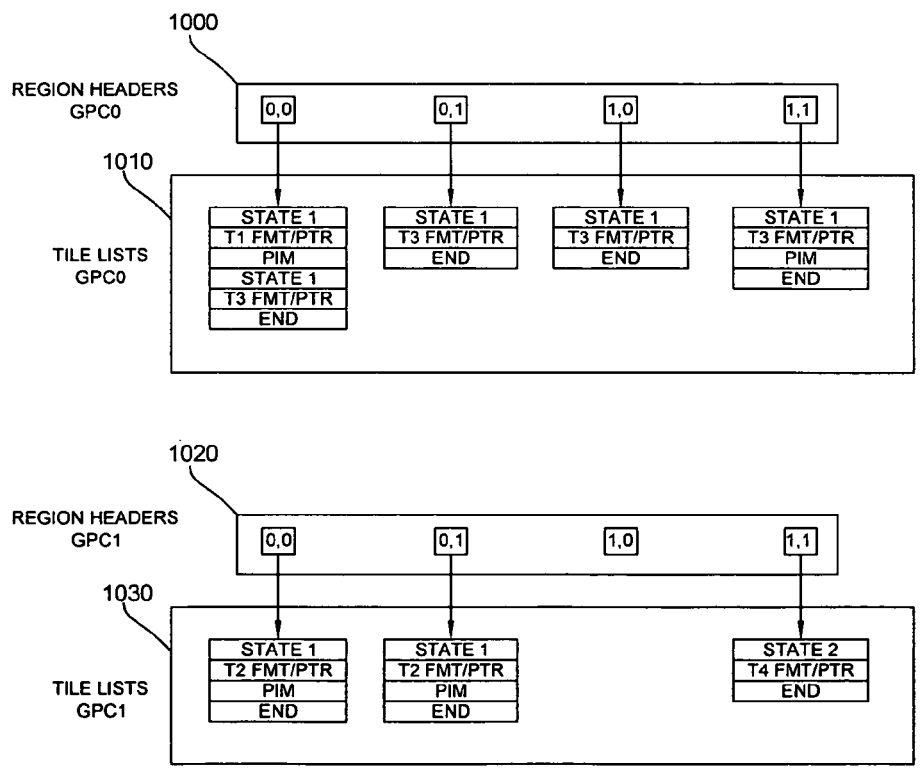
FIG. 10-TILE LIST DATA STRUCTURE USING "PIPELINE INTERLEAVE MARKERS"

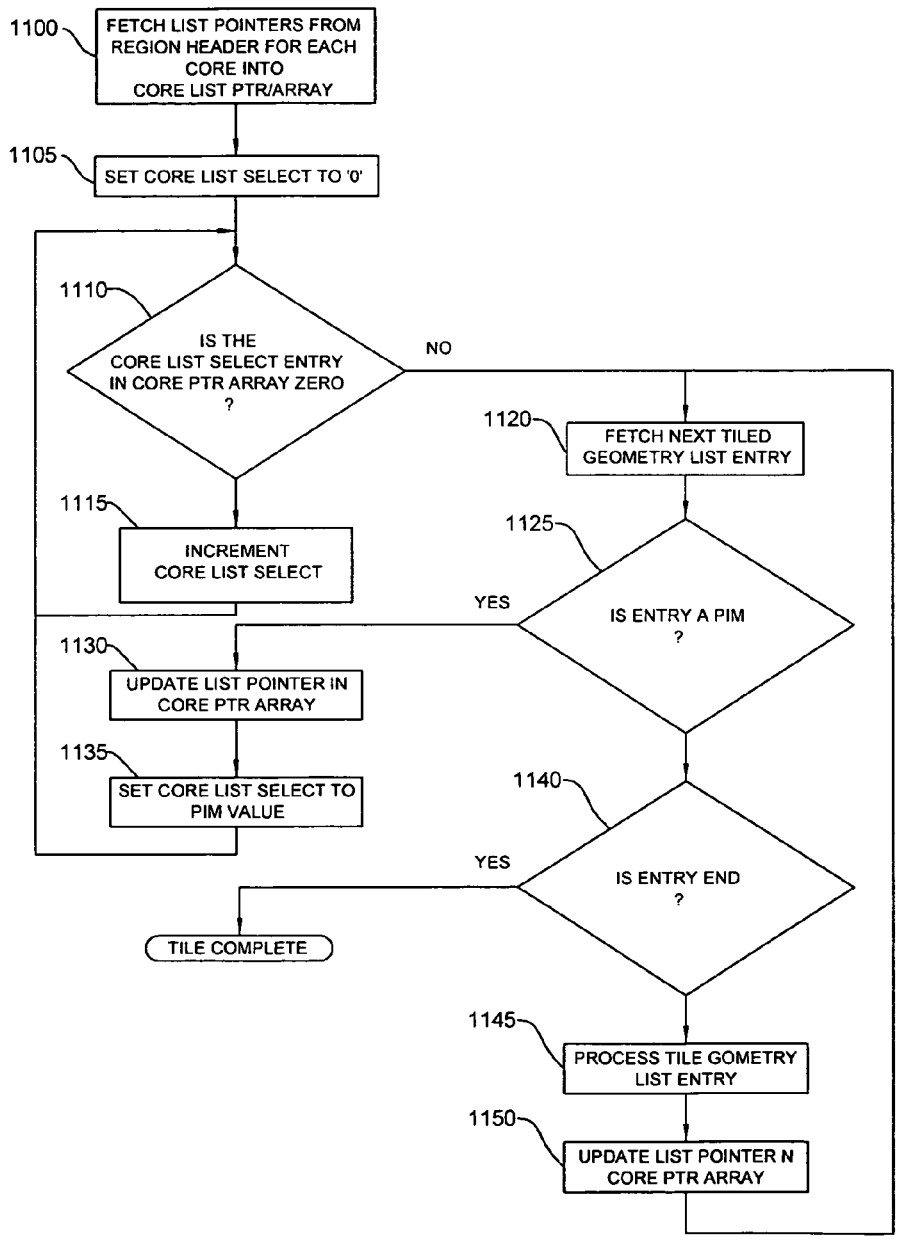
FIG. 11-RASTERISATION PROCESSING OF CONTROL LISTS AND "PIPELINE INTERLEAVE MARKERS"

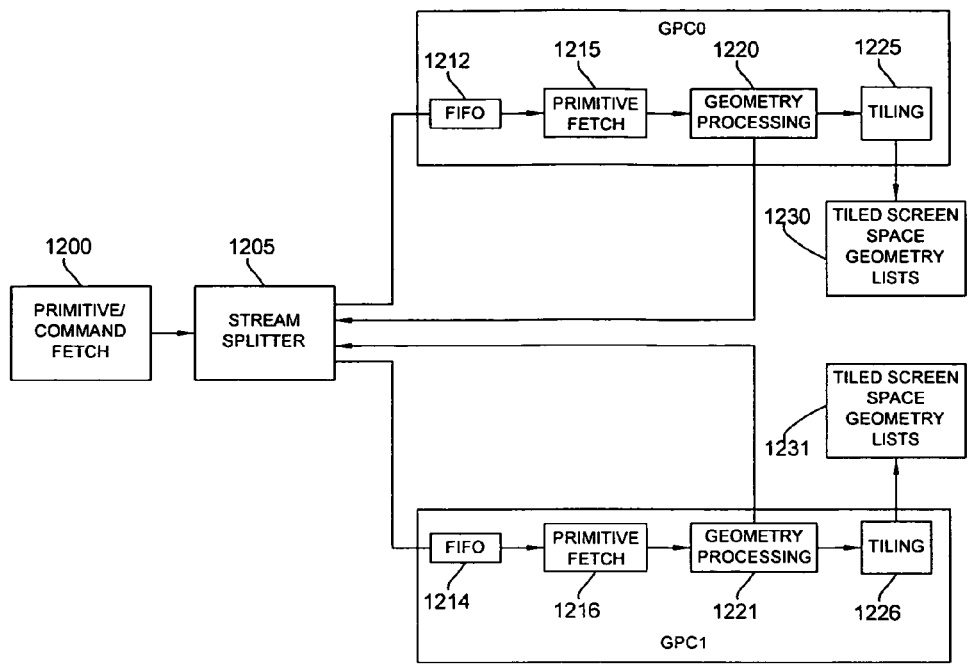
FIG. 12-EXAMPLE GEOMETRY PROCESSING SYSTEM
USING PIPELINE INTERLEAVE MARKERS
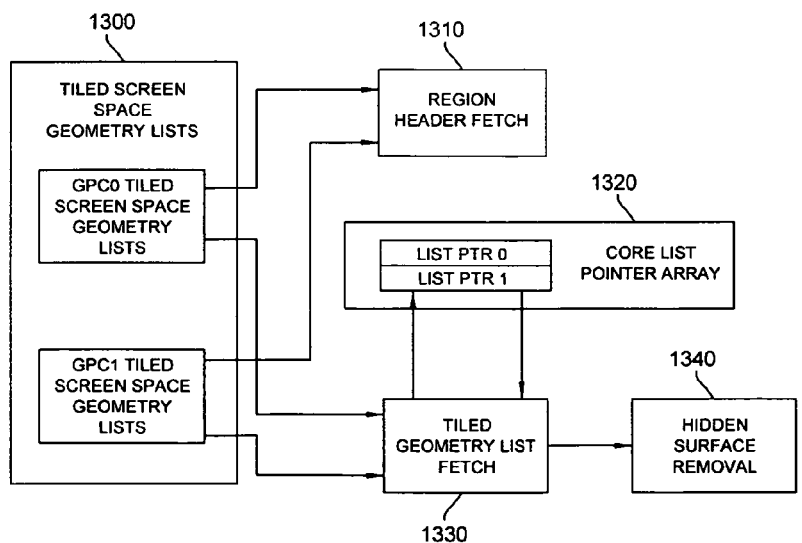
FIG. 13-EXAMPLE OF THE FRONT END OF A TILE BASED RASTERISATION
SYSTEM CAPABLE OF PROCESS TILE LISTS GENERATED BY A PIM BASES
GEOMETRY SYSTEM

MULTI-CORE GEOMETRY PROCESSING IN A TILE BASED RENDERING SYSTEM

This invention relates to a three-dimensional computer graphics rendering system and in particular to a method and an apparatus associated with combining multiple independent tile based graphics cores for the purpose of increasing geometry processing performance.

BACKGROUND OF THE INVENTION

It is desirable to offer computer graphics processing cores at many different performance points e.g. from basic handheld applications through to sophisticatedly dedicated graphic computers. However, the complexity of modern computer graphics makes it difficult to do this in either a timely or cost effective manner. As such, it is desirable to have a method of combining multiple independent cores such that performance may be increased without developing a whole new core.

Tile based rendering systems are well-known. These subdivide an image into a plurality of rectangular blocks or tiles. FIG. 1 illustrates an example of a tile based rendering system. A primitive/command fetch unit 101 retrieves command and primitive data from memory and passes the command and the primitive data to a geometry processing unit 102. The geometry processing unit 102 transforms the primitive and command data into screen space using well-known methods. This data is then supplied to a tiling unit 103 which inserts object data from the screen space geometry into object lists for each of a set of defined rectangular regions or tiles. An object list for each tile contains primitives that exist wholly or partially in that tile. The list exists for every tile on the screen, although some object lists may have no data in them. These object lists are fetched by a tile parameter fetch unit 105 which supplies the object lists tile by tile to a hidden surface removal unit (HSR) 106. The hidden surface removal unit (HSR) 106 removes surfaces which will not contribute to the final scene (usually because they are obscured by another surface). The HSR unit 106 processes each primitive in the tile and passes only data for visible pixels to a testing and shading unit (TSU) 108. The TSU takes the data from the HSR and uses the data to fetch textures and apply shading to each pixel within a visible object using well-known techniques. The TSU then supplies the textured and shaded data to an alpha test/fogging/alpha blending unit 110. The alpha test/fogging/alpha blending unit 110 can apply degrees of transparency/opacity to the surfaces again using well-known techniques. Alpha blending is performed using an on chip tile buffer 112 thereby eliminating the requirement to access external memory for this operation. Once each tile has been completed, the pixel processing unit 114 performs any necessary backend processing such as packing and anti-alias filtering before writing the result data to a rendered scene buffer 116, ready for display.

In British Patent No. GB2343598 there is described a process of scaling rasterization performance within a tile based rendering environment by separating geometry processing and tiling operations into a separate processor that supplies multiple rasterization cores. This method does not take into account the issues of scaling geometry processing and in particular tiling throughput across multiple parallel tile based cores.

It is commonly known that 3D hardware devices must preferably preserve the ordering of primitives with respect to the order in which they were submitted by a supplying application. For example FIG. 2 illustrates 4 triangles T1 (200), T2 (210), T3 (220) and T4 (230) that are present by the application in the order T1, T2, T3, T4 and overlap the four tiles Tile 0 (240), Tile 1 (250), Tile 2 (260) and Tile 3 (270) as shown. In order to preserve the original order of the triangles in the tile lists the triangles would be referenced in each tile list as follows.

| Tile 0 | Tile 1 | Tile 2 | Tile 3 |
|---|---|---|---|
| T1 | T2 | T3 | T3 |
| T2 | T3 |    | T4 |
| T3 |    |    |    |

In order to evenly distribute load across geometry and tiling processors, the input data needs to be split across the processors either on a round-robin basis or based on the load on individual processors. However, as each processor is generating object tile lists locally, the preservation of the order in which objects are inserted into tiles requires that the order in which the processors write to the per tile object lists be controlled. This control would normally require communication between each of the GPC's (Graphics Processing Cores) present, meaning that their design would need to be changed when scaling the number of cores present.

SUMMARY OF THE INVENTION

Preferred embodiments of the present invention provide a method and an apparatus that allow a tile based rendering system to scale geometry processing and tiling performance in a linear fashion. This is accomplished by the use of a hierarchical list structure that allows chunks of incoming geometry to be processed and tiled locally within a core and for resulting region lists from each core to be linked efficiently together in an order that corresponds to the original input geometry order. Further, the mechanism employed allows multiple cores to be used in parallel with little or no required modification to each of those cores.

Preferably, embodiments of the invention provide a method and an apparatus for combining multiple independent tile based graphic cores in which an incoming geometry stream is split into a plurality of geometry streams, one per tile based graphics processing core. Each core and separate tiled geometry lists for each triangle the core processes are then combined using either a master tiling unit which takes data from the geometry processing cores to generate a master tile list for each tile preserving the input geometry order, or during rasterization processing having markers within the tiled geometry lists to have the rasterization core switch between lists.

BRIEF DESCRIPTION OF THE DRAWINGS

Preferred embodiments of the invention will now be described in detail by way of examples with reference to the accompanying drawings in which:

FIG. 1 illustrates a prior art tile based rendering system as discussed above;

FIG. 2 illustrates an example set of four triangles overlapping four tiles as described above;

FIG. 3 illustrates the splitting of a control stream across multiple cores;

FIG. 4 shows the data structure proposed for the tile reference lists in an embodiment of the invention;

FIG. 5 shows a proposed hierarchical tile list data structure in an embodiment of the invention;

FIG. 6 illustrates the splitting of control stream across multiple core at a courser granularity in an embodiment of the invention;

FIG. 7 illustrates an example implementation of a system embodying the invention;

FIG. 8 illustrates a modification to the example system of FIG. 7;

FIG. 9 illustrates the splitting of a controls team across multiple cores using Pipe Interleave Markers;

FIG. 10 shows a proposed tile list data structure in an embodiment of the invention that uses Pipe Interleave Markers;

FIG. 11 illustrates the algorithm used by a rasterization core to process multiple tile lists that are linked together using Pipe Interleave Markers;

FIG. 12 illustrates an example geometry processing system using Pipeline Interleave Marks; and FIG. 13 illustrates an example of the front end of a tile based rasterization system capable of generating the process tile lists by a PIM based geometry system.

DETAILED DESCRIPTION OF PREFERRED EMBODIMENTS

FIG. 3 illustrates a simplified version of the proposed system using a master tiling unit to combine the geometry lists. In order to process incoming geometry stream 300 across multiple cores, the geometry stream 300 must first be split into separate streams, one per core by a stream splitter 310 which divides the data stream for processing across (in this example) the two geometry processing cores (GPC) 340 and 350. In this example, the incoming stream is distributed across the two cores in a simple round-robin basis. However, it is also possible to split the stream across the processing cores based on the processing load on each core. It is important to note that the stream splitter distributes control state as well as primitives to each geometry processing core. The control state contains information that instructs the hardware how to process the geometry data. For example, a matrix may be used to transform the geometry in a well known manner or details may be included regarding how texturing will be applied to the geometry. For example, the control stream for GPC0 320 contains control state 1 associated with triangles T1 through T3, and the control stream for GPC1 330 contains state 1 for T1 through T3 and state 2 for T4.

Each of the GPC's 340 and 350 generates a separate tiled geometry list 360 and 370 for each triangle that it processes. For each tile that is updated for each triangle, the GPC's insert a reference into a respective one of the tile reference lists (TRL) 365 and 375. The TRL's and the per GPC tile geometry lists form the data structures illustrated in FIG. 4, and are used by a master tiling unit 380 to produce a master tile list 390.

The TRL 400 for GPC0 contains references for triangles T1 and T3 that are processed through that core. For example, T1 is present in tile 0.0 only, and thus a reference and a pointer to the corresponding tiled geometry list 410 are included in the TRL, followed by references for T3 in all four tiles. Similarly the TRL for GPC1 420 contains references for each tile overlapped by T2 and T4 in the corresponding tiled geometry list for GPC1 430. It should be noted that the tiled triangle lists include an "End" marker after each triangle is indicated at 430.

The master tiling unit (MTU) 380 in FIG. 3 reads the TRL's in the same round-robin order that the primitives are distributed across the GPC's (in this example), taking the tile references for one triangle from each TRL before moving to the next. The MTU 380 takes the tile references and generates a master tile list 390, and this list has the data structure illustrated in FIG. 5. With a normal tile based rendering system, each tile in region headers 500 points to a corresponding tile list within the top level tile lists 510. It should be noted that these lists preserve the original presentation order of the triangles and each list has a "Terminate" master. The top level tile lists contain links to the referenced triangle lists within each tile 520 and 530 as generated by the GPC's and discussed above.

As mentioned above, each triangle in each GPC tiled list is followed by an "End" marker. These markers are used by rasterization hardware in order to instruct it to move from the GPC tile lists back to the high level tile list. The marker is used so that groups of triangles can be processed on each GPC instead of single triangles. This is important as it minimizes the amount of memory associated with the high level tile lists and allows greater decoupling of GPC's in case that the vertex processing on some triangles takes more time than others.

FIG. 6 illustrates the splitting of the incoming primitive stream from an application across multiple GPC's where blocks of 1000 triangles are pushed down to each GPC. The incoming data stream 600 contains four primitives, prim 1, 2, 3 and 4. Each primitive contains 4, 50, 2000, 1500 triangles respectively. The stream splitter 610 splits the stream into four blocks for processing across the two GPC's (650 and 660) as illustrated. Blocks 620 and 630 are passed to GPC0 and blocks 640 and 650 are passed to GPC1. Prim 1 and Prim 2 are both sent to GPC0 along with first portions of Prim 3 and Prim 4. The remaining portions of Prim 3 and Prim 4 are sent to GPC1. The purpose of the split is to attempt to balance the load between the two GPCs. In blocks 620 and 630, data from Prim 3 is also split between the two blocks, both of which are processed by GPC0. This process produces similar block sizes. The TRL and top level data structures are unchanged with the exception that instead of pointing to a single triangle, the per tile references point to groups of triangles from each block within each tile.

FIG. 7 illustrates an example of implementing a system that uses two geometry processing and tiling cores. The primitive and command fetch unit 700 reads the incoming control stream and passes it to the stream splitter unit 705 which splits the stream for processing across the two (or more) cores as described above. The splitter passes pointers to the primitives to be fetched for the separate cores, specifically the FIFO's 712 and 714 at the input to the "local" primitive fetch units 715 and 716. The FIFO's are required to help decouple the stream splitting processing from the time taken by each core in order to process each batch of the primitives. The local primitive fetch units read pointers from the FIFO's 712 and 714. The local primitive fetch units then read the actual geometry data from memory and pass it to the geometry processing units 720 and 721, which process the geometry and pass it to the local tiling units 725 and 726. The tiling units tile the processed geometry generated by local tiled lists 730 and 731, and pass TRL's for these lists into tile reference FIFO's 740 and 741 which buffer the previously described TRL's while waiting to be consumed by the master tiling unit (MTU) 750. It should be noted that these FIFO's can be contained either in external memory or on chip, allowing significant flexibility in the amount of buffering between the GPC's and the master tiling unit. The use of a FIFO/buffer allows the GPC's to be decoupled from the operation of the MTU, and this minimizes stalls in case that the MTU spends a significant amount of time generating the master tile lists. The MTU uses the TRL data from the FIFO's to generate the master region lists 760, which form the data structure together with the local tile lists as described above.

Using a simple round-robin scheme means that filling up either of the split stream FIFO's 712 or 714 due to one GPC takes significantly longer than the other GPC that the stream splitter will stall. As such, in the case of significant imbalance in processing time, these FIFO's may need to be significantly larger in order to prevent any of the GPC pipelines from being idle. FIG. 8 depicts an alternative embodiment in which the splitter sends groups of primitives to each core based on how busy that core is. The processing load of each core is monitored. The operation of the system is identical to one described above with the exception that the stream splitter 805 is fed with information from the geometry processing units 820 and 821 which indicates how busy they are, for example the fullness of input buffering. The stream splitter uses this information to direct groups of primitives to the GPC which is least heavily loaded. As the order which primitives will be submitted to the cores is now non-deterministic, the stream splitter must generate a core reference sequence for the MTU so that it can pull the TRL's from the TRL FIFO's in the correct order. The reference sequence is written into a Service Order FIFO 870 by the stream splitter which the MTU reads in order to determine which TRL FIFO is to be read next.

FIG. 9 illustrates a system that allows the geometry to be processed across multiple cores using "Pipe Interleave Markers" instead of a master tiling unit. Like the master tiling unit based system, the incoming geometry stream data is split by the stream splitter 910 and distributed to the GPCs 940, 950 as described above. Each GPC generates its own tiled geometry lists 960 and 970. FIG. 10 illustrates the structure of the tile geometry lists. Each GPC generates its own region headers 1000 and 1020 which point to the tiled geometry lists 1010 and 1030. Like the normal tile based rendering system, the geometry passes through each core. At the end of each geometry block, a GPC inserts a "Pipe Interleave Market" (PIM) 1040 which is used during the rasterization process to enable traversal of the lists in the correct order by a single core.

The flow chart in FIG. 11 illustrates how the rasterization uses the PIM markers to traverse the lists. At the start of processing each tile, the contents of the region headers generated by each core are loaded into a core list pointer array at 1100. This results in each entry within the array containing a pointer to the region list generated for each core of the region being processed. Processing of the region lists starts assuming that the first block of primitive data was processed by the first GPC i.e. GPC0 by setting an index into the array to 0 at 1105. The pointer value is then tested at 1110 to see if it is zero. If it is zero, it means the list is either empty or has already been processed to completion. The array index is incremented at 1115 and the test performed at 1110 is repeated. This process is repeated until a list that contains geometry is found where point data is fetched at 1120 from the tiled geometry list using the point indexed by the array index. At 1125, the fetched data is tested to determine if it is a PIM. If it is a PIM, then the current list pointer is updated to point to the next data in the tiled geometry list and written back into the core list pointer array at 1130. The array index is then set to the value specified within the PIM at 1135, and the processing jumps back to 1110. If the test at 1125 does not detect a PIM, the fetched data is tested to see if it is an End market at 1140. If an end is detected, then processing of the current tile has completed and the hardware will move onto processing the next tile. If the data is not an end marker, then it is a geometry or state reference and is processed at 1145 as necessary. The list pointer is then updated at 1150 and processing returns to 1120 to fetch the next entries within the tiled geometry list.

FIG. 12 illustrates an example of an implementation of a PIM based system that uses two geometry processing and tiling cores. The primitive and command fetch unit 1200 reads the incoming control stream and passes it to the stream splitter unit 1205 which splits the stream for processing across the two (or more) cores as described above. The splitter passes pointers to the primitives to be fetched to the separate cores, specifically the FIFO's 1212 and 1214 at the input to the "local" primitive fetch units 1215 and 1216. The FIFO's are required to help decouple the stream splitting processing from the time taken by each core to process each batch of primitives. The local primitive fetch units read the actual geometry data from memory and pass it to the geometry processing units 1220 and 1221, which process the geometry and pass it to the tiling units 1225 and 1226. The tiling units tile the processed geometry generated by the per core tile lists 1230 and 1231.

FIG. 13 illustrates the front end of the rasterization core capable of traversing tile lists generated by multiple GPC's using PIMs. The region header fetch unit 1310 reads the region headers from the screen space tiled geometry lists 1300 generated by each GPC and writes the resulting lists pointers into the core list pointer array 1320 as described in FIG. 11. The tiled geometry list fetch unit 1330 then fetches and processes the per tile control lists as described in FIG. 11, and passes resulting geometry to the hidden surface removal unit 1340. All of the processings at the hidden surface removal unit 1340 are the same as described for a normal tile based rendering system.

The invention claimed is:

1. A method for performing geometry processing and tiling in a three dimensional graphics rendering system comprising the steps of:
   providing a stream of graphics primitive data for a scene to be rendered, each primitive comprising data defining a plurality of triangles making up that primitive;
   splitting primitive data between a plurality of geometry processing units;
   for each triangle processed by each geometry processing unit, inserting a triangle into a respective tile list in a set of tiled geometry lists associated with that geometry processing unit;
   for each tile in which a triangle is inserted, inserting a reference to that tile into a tile reference list associated with that geometry processing unit; and
   generating a master tile list for the scene to be rendered from the tile reference lists and the tile geometry lists associated with the geometry processing units, including reading data from the tile reference lists associated with each geometry processing unit in the order in which data was distributed to the geometry processing units to generate a master tile list comprising pointers to each respective tile list in the set of tile geometry lists associated with each geometry processing unit.

2. The method according to claim 1, wherein the step of splitting primitive data comprises the step of splitting on a round robin basis.

3. The method according to claim 1, wherein the step of splitting primitive data is arranged to distribute substantially similar amounts of primitive data to each geometry processing unit.

4. The method according to claim 1, wherein the step of splitting primitive data comprises the steps of monitoring the processing load on each graphics processing unit and splitting data between graphic processing units in dependence on their processing loads.

5. The method according to claim 1, including the step of buffering primitive data between the step of splitting the primitive data and sending it to the graphics processing units.

6. The method according to claim 1, including the step of buffering data from tile reference lists and the tiled geometry lists before the step of generating the tiling data.

7. A system for performing geometry processing and tiling in a three dimensional graphics rendering system comprising:
   means for providing a stream of graphics primitive data for the scene to be rendered, each primitive comprising data defining a plurality of triangles making up that primitive;
   means for splitting primitive data between a plurality of geometry processing units;
   a geometry processing unit arranged to insert a triangle into a tiled geometry list in a set of tiled geometry lists associated with that geometry processing unit for each triangle processed;
   means for inserting a reference to that tile into a tile reference list associated with a geometry processing unit for each tile in which a triangle in inserted; and
   means for generating a master tile list for the scene to be rendered from the tile reference lists and the tiled geometry and
   means for generating a master tile list for the scene to be rendered from the tile reference lists and the tile geometry lists associated with the geometry processing units, including reading data from the tile reference lists associated with each geometry processing unit in the order in which data was distributed to the geometry processing units to generate a master tile list comprising pointers to each respective tile list in the set of tile geometry lists associated with each geometry processing unit.

8. The system according to claim 7, wherein the means for splitting primitive data does this on a round robin basis.

9. The system according to claim 7, wherein the means for splitting primitive data is arranged to distribute substantially similar amounts of primitive data to each geometry processing unit.

10. The system according to claim 7, wherein the means for splitting primitive data comprises means for monitoring the processing load on each graphics processing unit and means for splitting data between graphics processing units in dependence on their processing loads.

11. The system according to claim 10, wherein the means for using markers in the tiled geometry lists comprises means for reading region headers from each of the tiled geometry lists, means for writing tiling list pointers into a pointer array which points to the start of the tiled geometry lists generated by each graphics processing unit, and means for fetching the tiled geometry list for each tile in turn for use in rendering the scene.

12. The system according to claim 7 including means for buffering primitive data between the means for splitting the primitive data and the graphics processing unit.

13. The system according to claim 7 including means for buffering data from tile reference lists and the tile geometry before providing it to the means for generating a master tile list.

14. A method for performing geometry processing and tiling in a three dimensional graphics rendering system comprising the steps of:
   providing a stream of graphics primitive data for the scene to be rendered, each primitive comprising data defining a plurality of triangles making up that primitive;
   splitting primitive data between a plurality of geometry processing units, each unit generates its own region headers and its own tiled geometry lists with each region header pointing to the tiled geometry lists;
   for each triangle processed by each geometry processing unit, inserting a triangle into a respective tile list in a set of tiled geometry lists associated with that geometry processing unit;
   for each tile, a geometry processing unit inserts a pipe interleave marker into the tiled geometry lists associated with that geometry processing unit for each block of geometry processed by each graphics processing unit; which is used during rasterization to enable traversal of the lists in the correct order by a single processing core;
   generating tiling data for the scene to be rendered from the tiled geometry lists associated with each geometry processing unit;
   and using the markers in the tiled geometry lists to indicate when to switch between tiled geometry lists from different graphics processing units.

15. The method according to claim 14, wherein the step of splitting primitive data comprises the step of splitting on a round robin basis.

16. The method according to claim 14, wherein the step of splitting primitive data is arranged to distribute substantially similar amounts of primitive data to each geometry processing unit.

17. The method according to claim 14, wherein the step of splitting primitive data comprises the steps of monitoring the processing load on each graphics processing unit and splitting data between graphic processing units in dependence on their processing loads.

18. The method according to claim 14 including the step of buffering primitive data between the step of splitting the primitive data and sending it to the graphics processing units.

19. The method according to claim 14 including the step of buffering data from the tiled geometry lists before the step of generating the tiling data.

20. The method according to claim 14, wherein the step of using the markers in the tiled geometry lists comprises the steps of reading region headers from each of the tiled geometry lists, and writing tiling list pointers into a pointer array which points to the start of the tiled geometry lists generated by each graphics processing unit lists, for each tile in turn, for use in rendering the scene.

21. A system for performing geometry processing and tiling in a three dimensional graphics rendering system comprising:
   means for providing a stream of graphics primitive data for the scene to be rendered, each primitive comprising data defining a plurality of triangles making up that primitive;
   means for splitting primitive data between a plurality of geometry processing units, each unit generates its own region headers and its own tiled geometry lists with each region header pointing to the tiled geometry lists;
   each geometry processing unit arranged to insert a triangle into a tiled geometry list in a set of tiled geometry lists associated with that geometry processing unit for each triangle processed;
   means for inserting, by a geometry processing unit, a pipe interleave marker for each tile into the tiled geometry lists associated with that geometry processing unit, for each block of geometry processed by that graphics processing unit; which is used during rasterization to enable traversal of the lists in the correct order by a single processing unit;
   means for generating tiling data for the scene to be rendered from the tiled geometry associated with each geometry processing unit; and means for indicating with the markers in the tiled geometry lists when to switch between tiled geometry lists from different graphics processing cores.

22. The system according to claim 21, wherein the means for splitting primitive data does this on a round robin basis.

23. The system according to claim 21, wherein the means for splitting primitive data is arranged to distribute substantially similar amounts of primitive data to each geometry processing unit.

24. The system according to claim 21 wherein the means for splitting primitive data comprises means for monitoring the processing load on each graphics processing unit and means for splitting data between graphics processing units in dependence on their processing loads.

25. The system according to claim 21 including means for buffering primitive data between the means for splitting the primitive data and the graphics processing unit.

26. The system according to claim 21 including means for buffering data from tile reference lists and the tile geometry before providing it to the means for generating tiling data.

* * * * *